United States Patent [19]
Schlanger

[11] Patent Number: 5,810,503
[45] Date of Patent: Sep. 22, 1998

[54] CLAMPING DEVICE

[76] Inventor: Raphael Schlanger, 128 Hulda Hill Rd., Wilton, Conn. 06897

[21] Appl. No.: 797,302

[22] Filed: Feb. 7, 1997

[51] Int. Cl.$^6$ ....................................................... B25G 3/00
[52] U.S. Cl. .......................... 403/261; 403/234; 403/374; 403/385; 403/DIG. 9; 24/19; 24/20 R
[58] Field of Search .................... 403/18, 109, 110, 403/231, 232, 233, 234, 235, 236, 237, 256, 260, 261, 373, 374, 385, DIG. 9; 24/19, 20 R, 270, 278

[56] References Cited

U.S. PATENT DOCUMENTS

| | | | | |
|---|---|---|---|---|
| 604,981 | 5/1898 | Guy | .......................................... | 403/256 |
| 626,836 | 6/1899 | Larsen | ...................................... | 403/256 |
| 757,195 | 4/1904 | Huff | ......................................... | 403/256 |
| 1,911,459 | 5/1933 | Mitchell | ............................... | 403/234 X |
| 2,765,675 | 10/1956 | Hatala | .................................. | 403/256 X |
| 3,345,092 | 10/1967 | Athman et al. | ...................... | 403/110 X |
| 4,507,105 | 3/1985 | Stottmann et al. | ................. | 403/234 X |
| 5,662,429 | 9/1997 | Battocchio | ........................... | 403/109 X |

FOREIGN PATENT DOCUMENTS 604806  8/1976  U.S.S.R. ................................. 403/234

*Primary Examiner*—Daniel P. Stodola
*Assistant Examiner*—Bruce A. Lev
*Attorney, Agent, or Firm*—Bachman & LaPointe, P.C.

[57] ABSTRACT

Clamping device for clamping a shaft to a base member including a base member, at least one clamping element spaced from the base member, a shaft having a longitudinal axis and extending along the base member between the base member and clamping element, connecting links connecting the clamping element to the base member, and a bolt for moving the clamping element into locking engagement with the shaft exerting a clamping action on the shaft which is parallel to the shaft.

35 Claims, 10 Drawing Sheets

CLAMPING DEVICE

BACKGROUND OF THE INVENTION

The present invention involves a method of clamping a shaft to a base member.

There are many applications that involve clamping a shaft to a base member, such as for example, scaffolding or any application that involves the assembly of a shaft and a base member.

Generally, the shaft passes through a hole either in or associated with the base member and it is desirable to achieve a controlled fit of the shaft in the hole without distortion of the shaft in the clamped position.

Thus, for example, a pinch-bolt type of connector is commonly used that applies force in a direction generally perpendicular to the axis of the shaft, for example as shown in U.S. Pat. No. 757,195. These connectors obtain high pressure points unevenly distributed on the shaft, whereas it is desirable to obtain an even distribution of pressure on the shaft.

It is desirable to obtain the foregoing in a device which is easy to manufacture and which is versatile for a variety of applications.

Accordingly, it is a principal object of the present invention to provide a simple and convenient clamping device for clamping a shaft to a base member which is characterized by ease of manufacture.

It is a further object of the present invention to provide a clamping device as aforesaid which is versatile and adaptable for a variety of applications.

It is a still further object of the present invention to provide a clamping device as aforesaid which applies even pressure on the shaft without distortion of the clamping surfaces.

Further objects and advantages of the present invention will appear hereinbelow.

SUMMARY OF THE INVENTION

In accordance with the present invention, the foregoing objects and advantages are readily obtained.

The present invention provides a clamping device for clamping a shaft to a base member, which comprises: at least one base member; at least one clamping element spaced from the base member; a shaft having a longitudinal axis, said shaft extending along the base member between the base member and clamping element; linking means connecting the clamping element to the base member; and means for moving the clamping element into locking engagement with the shaft exerting a clamping action on the shaft generally parallel to the shaft.

In a preferred embodiment, at least two clamping elements are provided spaced from the base member and spaced apart by a channel running generally perpendicular to the axis of the shaft.

Further features of the present invention will appear hereinbelow.

BRIEF DESCRIPTION OF THE DRAWINGS

The present invention will be more readily understandable from a consideration of the following illustrative embodiments, in which.

DETAILED DESCRIPTION OF PREFERRED EMBODIMENTS

Figure 1:
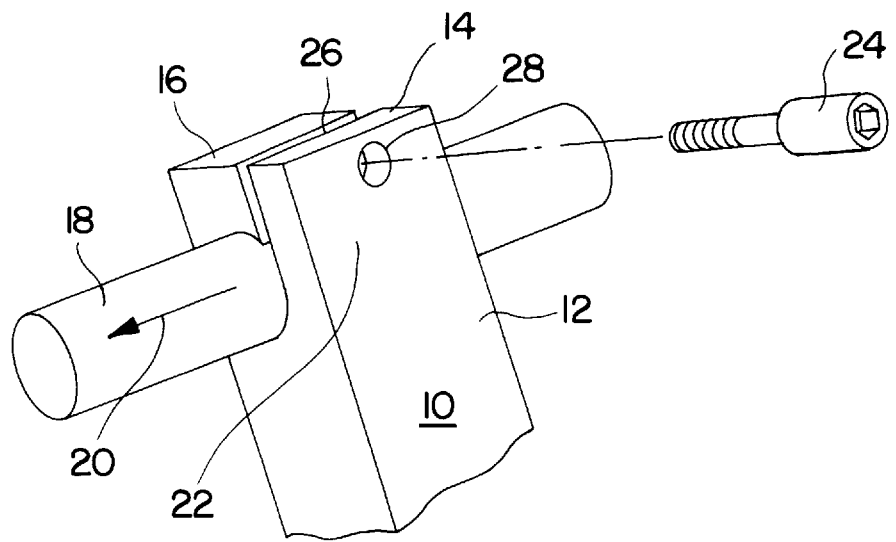
FIG. 1 is a perspective view of a prior art clamping device.

FIG. 1 shows a perspective view of a conventional prior art pinch-bolt type of connector 10 that is commonly used including base member 12, clamping elements 14, 16 spaced from base member 12 and shaft 18 having a longitudinal axis 20, said shaft extending along the base member between the base member and clamping elements. The clamping elements 14, 16 are connected to the base member 10 by connecting links 22 and pinch bolt 24 seatable in pinch bolt hole 28 is provided for moving the clamping elements into locking engagement with the shaft. The clamping elements are spaced apart by channel 26.

However, pinch bolt 24 applies force in a direction generally perpendicular to the axis of the shaft, and channel 26 is parallel to the axis of the shaft. The pinch bolt acts to bind the clamping elements on the shaft.

Figure 2:
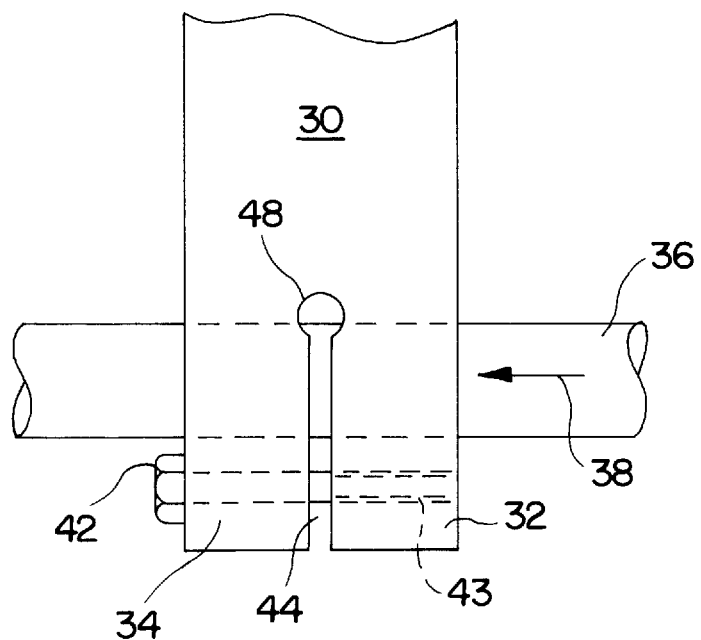
FIGS. 2 and 3 are side and perspective views, respectively, of an embodiment of the clamping device of the present invention.
Figure 3:
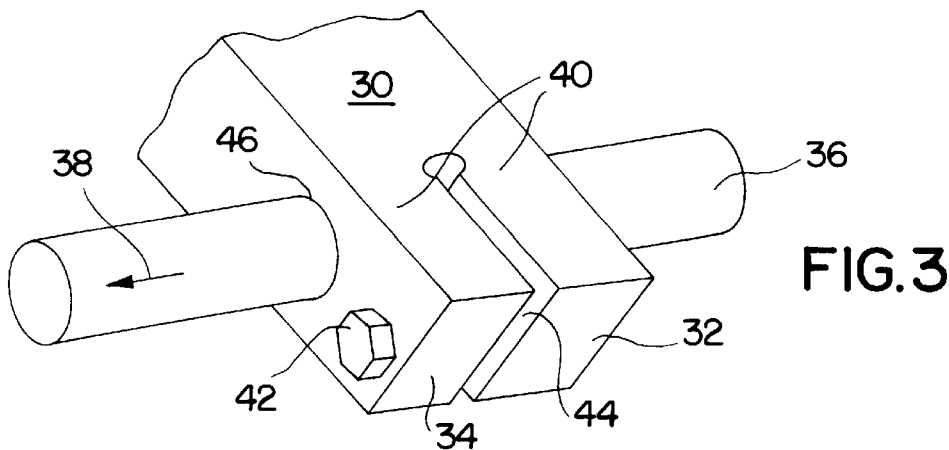

FIGS. 2 and 3, on the other hand, are side and perspective views of a clamping device of the present invention including base member 30, clamping elements 32, 34 spaced from the base member and shaft 36 having a longitudinal axis 38 extending along the base member and clamping elements. The clamping elements 32, 34 are connected to the base member 30 by connecting links 40 and clamp or pinch bolt 42 is provided in pinch bolt hole 43 extending through the clamping elements for moving the clamping elements into locking engagement with the shaft by exerting a clamping action on the shaft. The clamping elements are spaced apart by a channel 44 extending to base 30. Thus, when clamp bolt 42 is tightened, the clamping elements 32, 34 exert a clamping action on shaft 36, and when the clamp bolt is loosened, the clamping action is released and shaft 36 is free to move longitudinally in shaft bore or hole 46.

However, in distinction to the prior art device in FIG. 1, the clamping action exerted on the shaft is exerted in a direction generally parallel to the shaft, and also the clamping elements are spaced apart by a channel running generally perpendicular to the axis of the shaft.

This configuration obtains significant advantages over the prior art device. In accordance with the configuration of the present invention, clamping forces are more evenly distributed around the shaft. In accordance with the conventional approach shown in FIG. 1, there is inherently some distortion in the split collar during the take-up as the pinch bolt is tightened. Since the clamping action depends on the tightening of the wrap geometry, relative movement (sliding) between collar and shaft occurs in a circumferential direction during clamping. This circumferential sliding action coupled with any stretching that occurs in the collar can slightly distort the geometry of the clamping element. This is generally not a problem with circular shafts, but in the case of non-circular shafts, this distortion creates an uneven pressure distribution on the surfaces of the shaft.

On the other hand, in accordance with the present invention, since take-up occurs in a direction parallel to the axis of the shaft, distortion of the clamping surfaces relative to the shaft does not occur. This can be a significant advantage in the case of non-circular shafts. The present invention exerts an even pressure distribution across the shaft.

These advantages are obtained in a device which is easy to manufacture at a reasonable cost. Moreover, the shaft bore and pinch bolt hole are parallel to each other so that the two holes can be machined in one set up, creating a substantial time savings in manufacture.

Moreover, the present device is versatile and readily adaptable to a variety of applications and service conditions. For example, the present device readily obtains a quick-release feature.

If desired, one may provide a strain relief means, such as enlarged opening 48 in channel 44 and around shaft 36.

Figure 4:
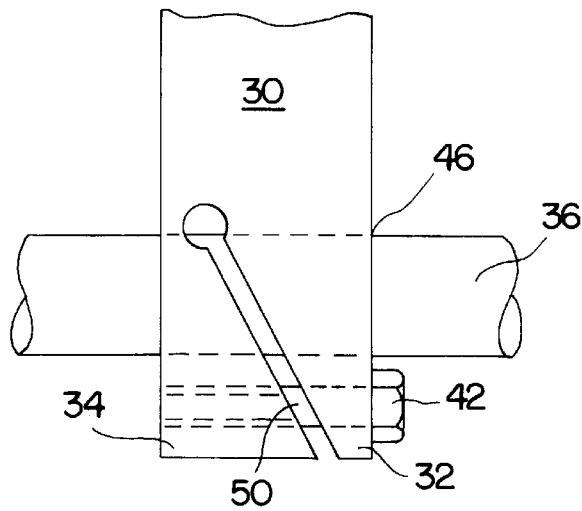
FIGS. 4 and 5 are side views of additional embodiments of the clamping device of the present invention.

FIG. 4 is similar to FIGS. 2 and 3, except that channel 50 is cut diagonally with respect to shaft 36 and shaft bore 46. This creates a more effective, and rapid, clamping action.

Figure 5:
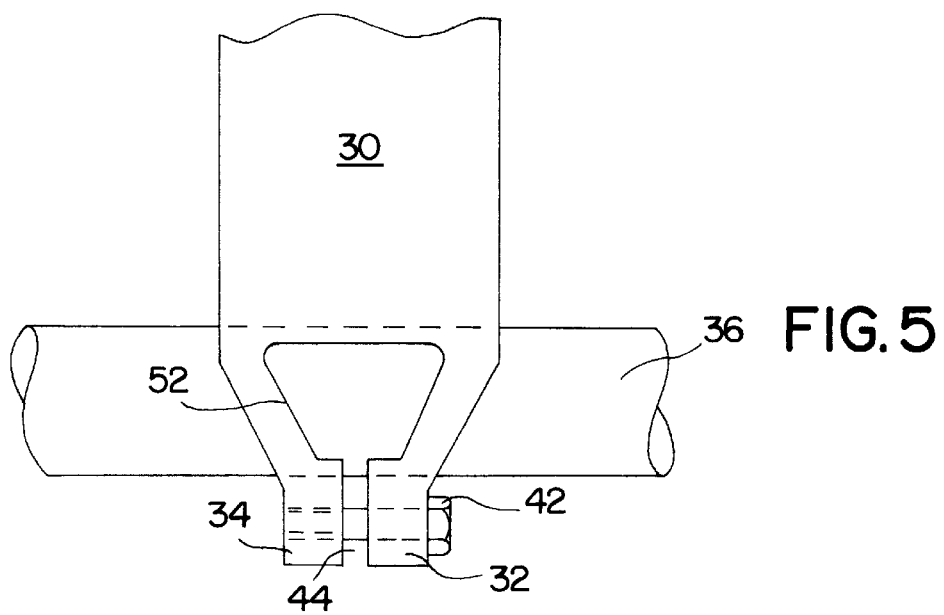

FIG. 5 is also similar to FIGS. 2 and 3, except that channel 44 flares outwardly adjacent shaft 36 to create an enlarged opening 52 surrounding shaft 36. This embodiment obtains good clamping action with strain relief. An advantageous function of the enlarged opening is to thin down the link flexures to have the suppleness required for smooth action, i.e, portions of the link arms adjacent the shaft are relatively thinned to provide a low stiffness region or flexure point.

Figure 6:
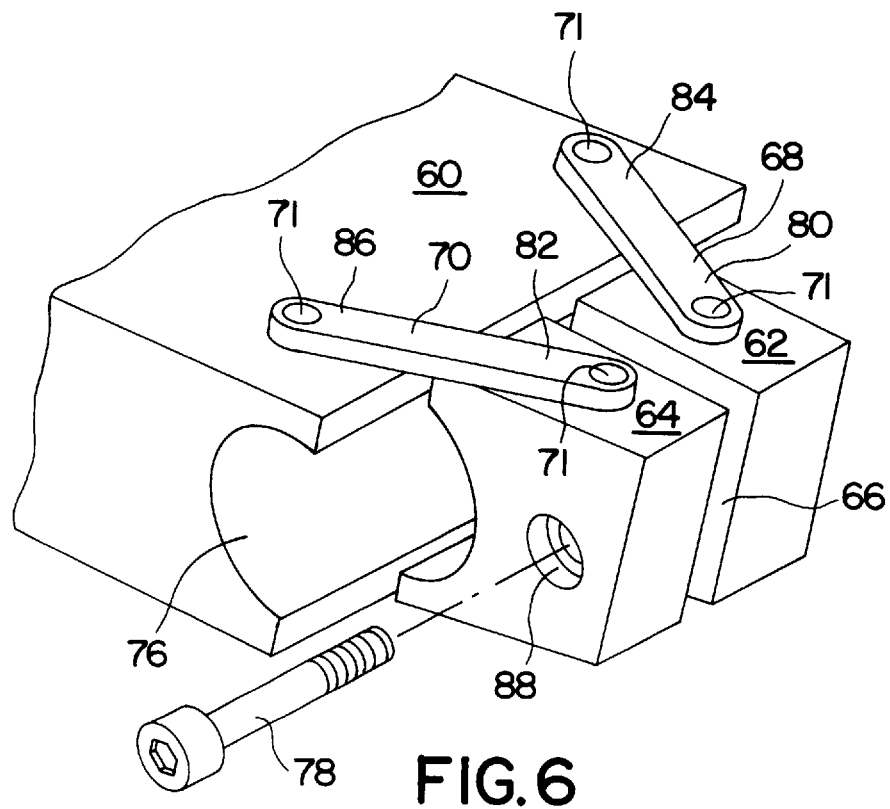
FIGS. 6 and 7 are perspective and side views, respectively, of a further embodiment of the present invention.
Figure 7:
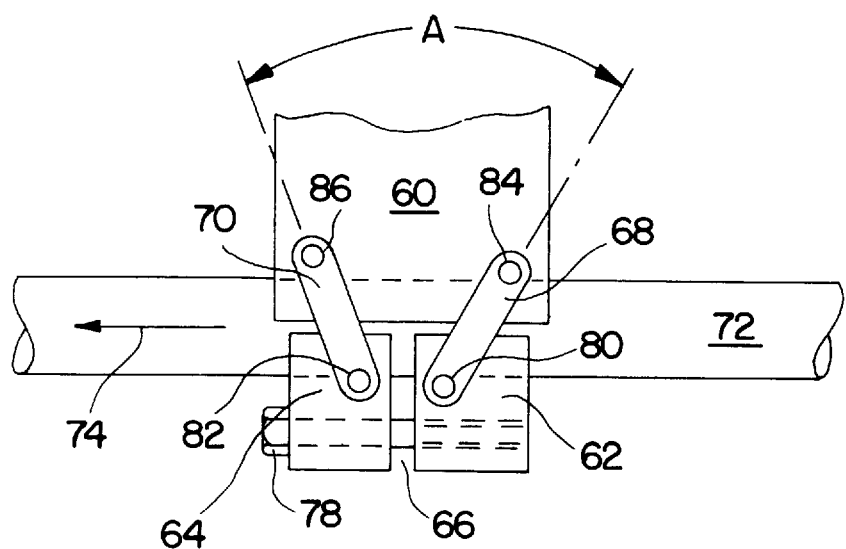

FIGS. 6 and 7 show base member 60 and two separate clamping elements 62, 64 spaced apart by channel 66 and joined to the base member by link arms 68, 70, respectively, which pivot on pivot points 71. The upper portions of link arms 80, 82, respectively, are affixed to clamping elements 62, 64, respectively, and lower portions of the link arms 84, 86, respectively, are affixed to the base element 60. Shaft 72 having a longitudinal axis 74 extends along the base member 60 and clamping elements 62, 64 in shaft bore 76 formed by the base member and clamping elements. Pinch bolt 78 is provided in pinch bolt hole 88 extending through the clamping elements for moving the clamping elements into locking engagement with the shaft as shown in FIG. 7. Thus, as shown in FIG. 7, as pinch bolt 78 is tightened the clamping action is increased and angle A between the link bolts 68, 70 lower portions 84, 86 also increases. In this embodiment, the base member, clamping elements and link arms are separate elements allowing for a considerable flexibility in design.

Thus, in accordance with the embodiment of FIGS. 6 and 7, the upper portions 80, 82 of link arms 68, 70 move in an arc as lower portions 84, 86 are fixed during tightening and loosening. As angle A is increased, the clamping action becomes faster although clamping power is decreased. This embodiment is versatile and can be designed for quick action and less mechanical advantage or slow action and greater mechanical advantage.

Figure 8:
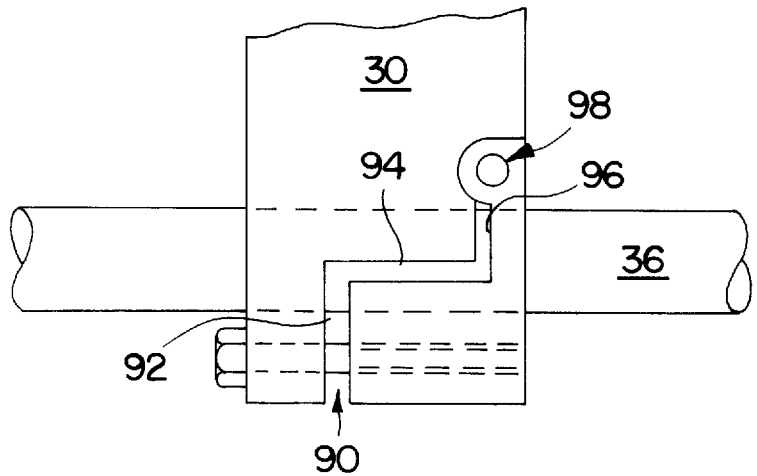
FIGS. 8–10 are side views of further embodiments of the present invention.

FIG. 8 is similar to FIGS. 2 and 3, with channel 90 having a stepped configuration, with upper portion 92 running perpendicular to shaft 36, intermediate portion 94 running parallel to shaft 36, and lower portion 96 running perpendicular to shaft 36, and with pivot 98 affixed to base 30. Significantly, in this embodiment, the clamping element is contiguous with the link. This embodiment is similar to FIG. 4, except that it uses a pivot instead of a flexure. Moreover, if the convenient pivot pin did not exist the pinch bolt would still serve to retain the link end, thus allowing for easy disassembly of the link/clamping element from the base. Further, the pinch bolt serves to firmly affix the pivot in its socket.

Figure 9:
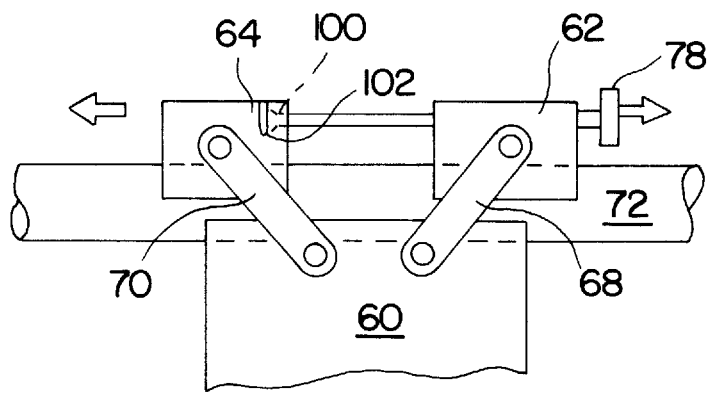

FIG. 9 is similar to FIGS. 6 and 7 with separate base member 60 and clamping elements 62, 64 and link arms 68, 70. However, bolt 78 end portion 100 abuts plate 102 so that tightening bolt 78 moves clamping elements 62, 64 apart and increases tension and moves the clamping elements into locking engagement with shaft 72. As bolt 78 is loosened, the tension is released and the clamping elements are moved out of locking engagement with shaft 72. Therefore, in FIG. 9, tightening bolt 78 moves clamping elements 62, 64 farther apart and moves them into locking engagement with shaft 72; whereas, in FIGS. 6 and 7, tightening bolt 78 moves clamping elements 62, 64 closer together and moves them into locking engagement with shaft 72.

Figure 10:
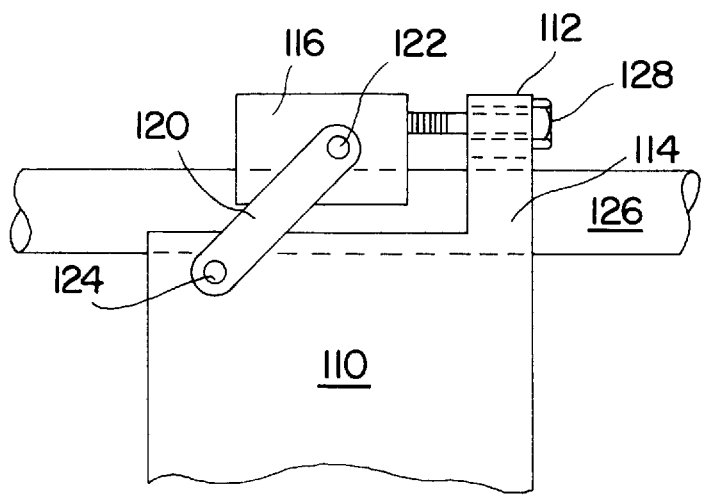

FIG. 10 includes base member 110, first clamping element 112 integrally affixed to the base member 110 by link member 114 and second clamping element 116 which is a piece separate from the base member and spaced therefrom and affixed thereto by link arm 120. The link arm 120 pivots on upper pivot point 122 affixed to clamping element 116 and lower pivot point 124 affixed to base member 110. Shaft 126 extends along the base member between the base member and clamping elements. Tightening screw 128 moves link arm 120 in a clockwise direction towards fixed clamping element 112 and moves clamping element 116 into locking engagement with shaft 126.

Figure 11:
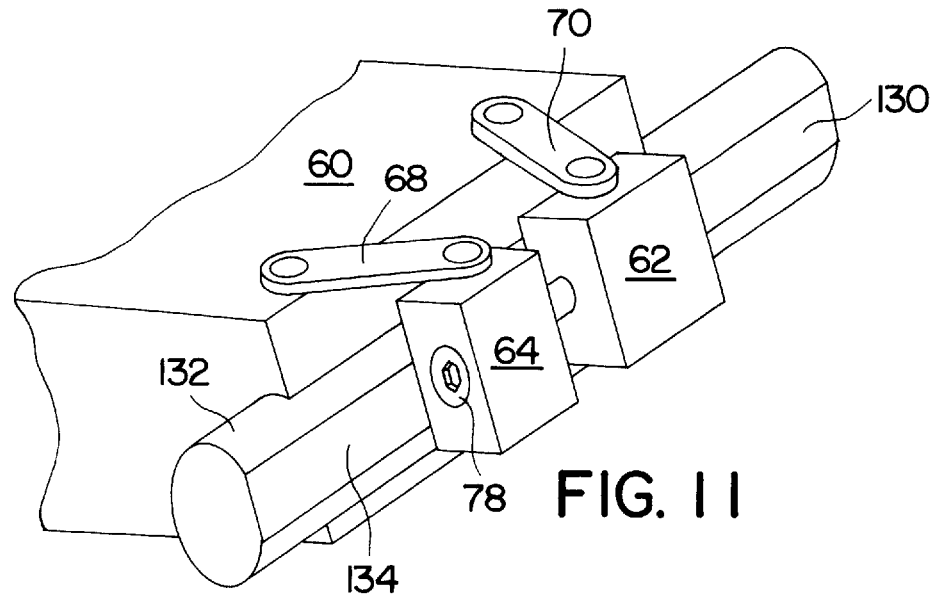
FIG. 11, 12A and 12B are perspective and side views of a further embodiment of the present invention.
Figure 12A:
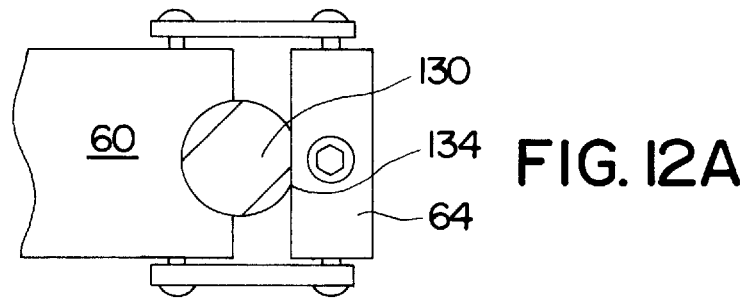
Figure 12B:
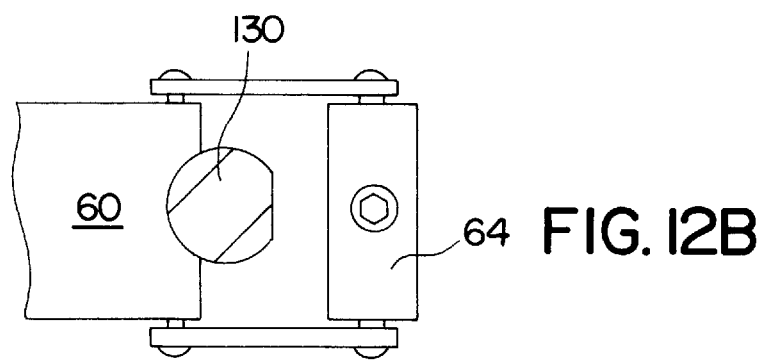

FIGS. 11, 12A and 12B show an embodiment similar to FIGS. 6 and 7 using a non-circular shaft 130 having an annular portion 132 and flat portion 134. In the locked position shown in FIG. 12A, shaft 130 is in locking engagement with base member 60 and clamping element 64 with flat portion 134 in locked engagement with clamping element 64. Thus, in FIG. 12A, shaft 130 is locked from rotation and also from linear movement. In the unlocked position shown in FIG. 12B, shaft 130 is free to rotate and also slide axially.

Figure 13:
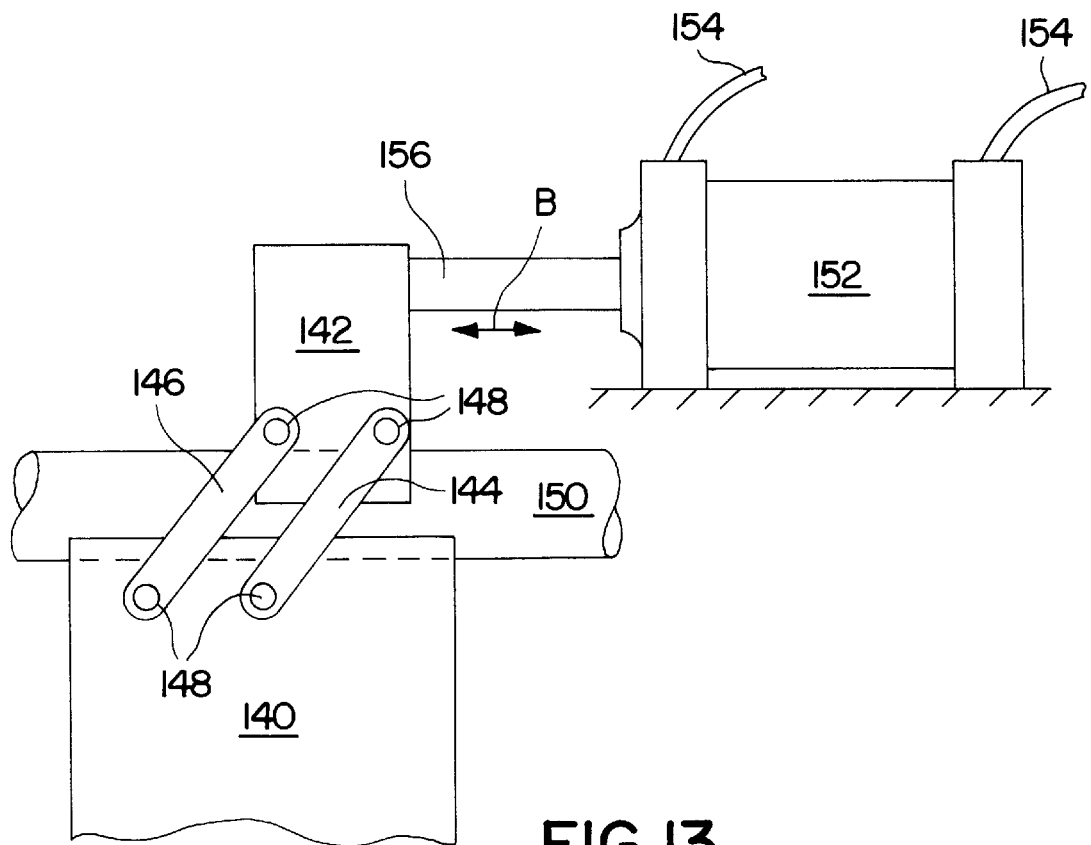
FIG. 13 is a side view of a further embodiment of the present invention.

FIG. 13 includes base member 140 and a single clamping element 142 spaced from the base member and connected thereto by link elements 144, 146 which pivot on pivot points 148. Shaft 150 extends between base member 140 and clamping element 142. Hydraulic cylinder 152 fed by fluid lines 154 and suitable power means and connected to clamping element 142 by arm 156 which moves clamping element 142 into and out of locking engagement with shaft 140 by moving the clamping element in the directions shown by arrow B. Any suitable motive means may be used for the means for moving the clamping element, such as a hydraulic cylinder as shown or an electric or gas motor, pneumatics, solenoids, cams, etc.

Figure 14:
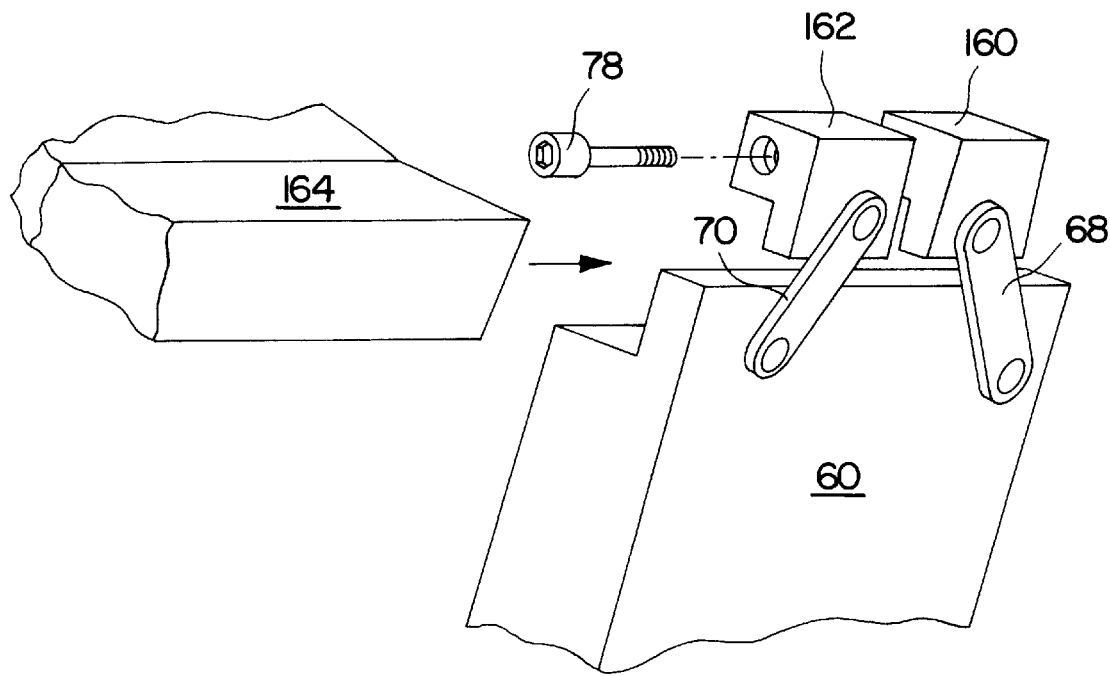
FIGS. 14 and 15 are perspective views of a further embodiment of the present invention.
Figure 15:
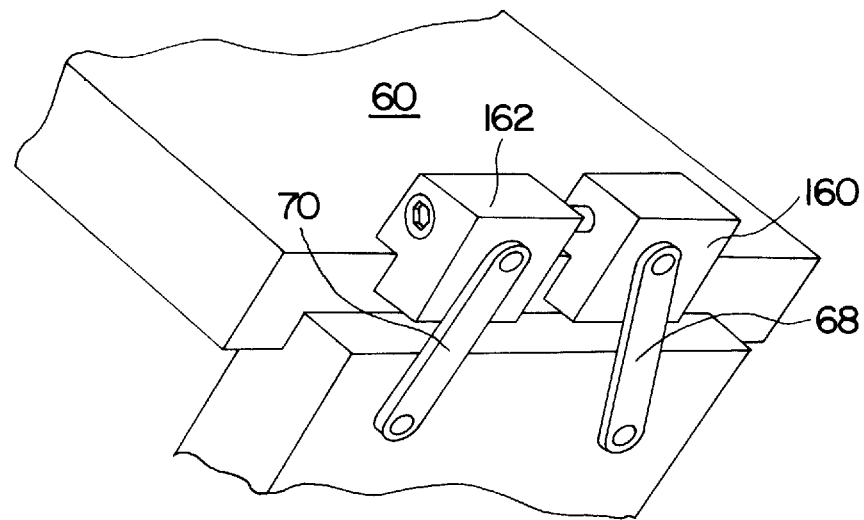

FIGS. 14 and 15 are similar to FIGS. 6 and 7 using open-sided clamping elements 160, 162 and a non-circular shaft 164 which can be the edge of a plate as shown, although this embodiment is not limited to a non-circular shaft. A circular shaft could be used in this embodiment, although it would be desirable to include mating geometry in the clamping elements. The open-sided clamping permits easy shaft removal or for clamping to the edge of a shaft. Thus, in this embodiment, the shaft can have a wide variety of shapes other than circular since it is not confined by the surrounding components. For example, as shown in FIGS. 14 and 15, the shaft can be the edge of a large plate or other type of geometry much larger than the connector itself. As an additional feature of this embodiment, the shaft can be removed from the connector (or vice versa) without completely withdrawing the full length of the shaft. This "quick-release" approach allows for easy disassembly of the shaft from the connector as well as permitting disassembly even in the case of very long shafts.

Figure 16:
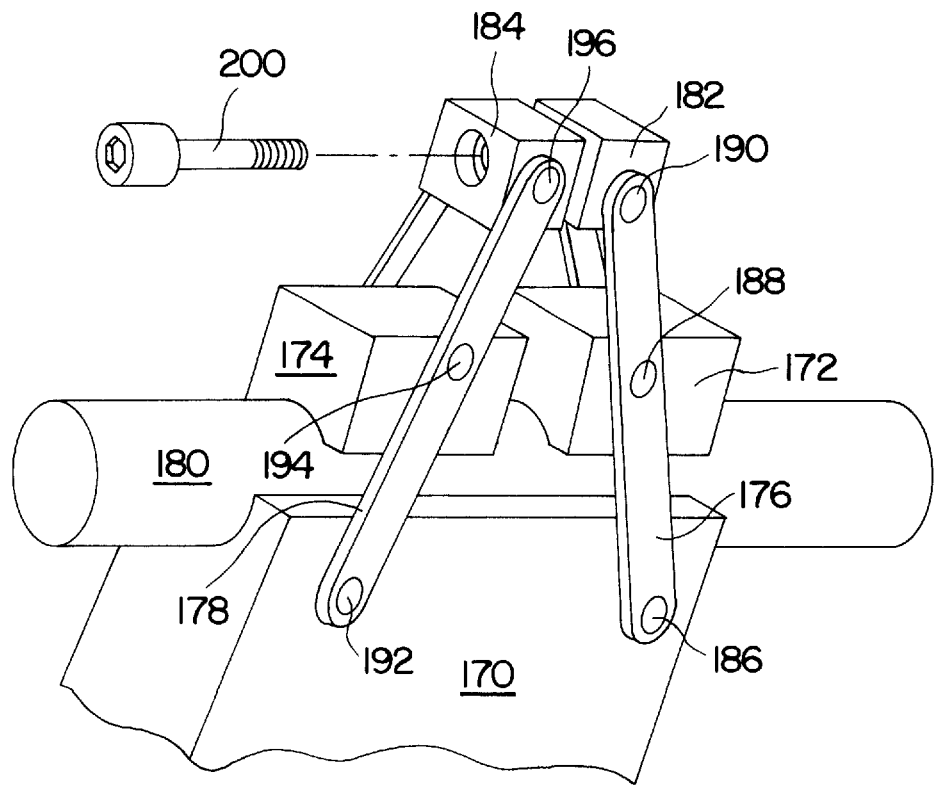
FIGS. 16–18 are perspective and side views of further embodiments of the present invention.
Figure 17:
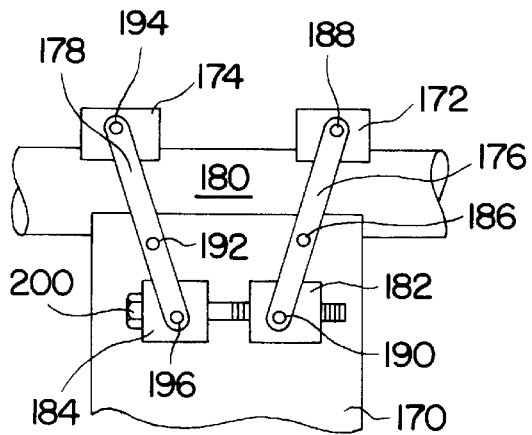
Figure 18:
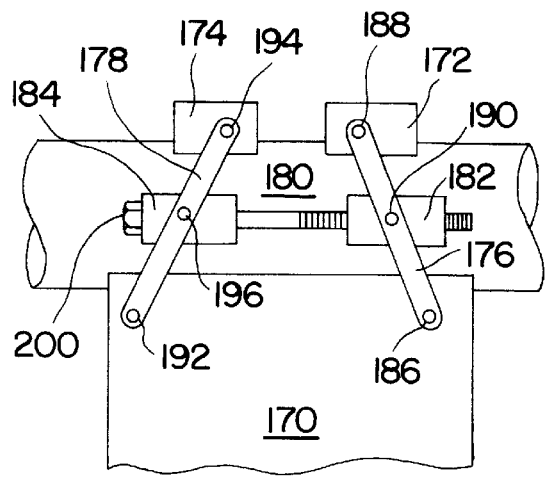

FIGS. 16, 17 and 18 are similar to FIGS. 6 and 7. Referring first to the embodiment of FIG. 16, base member 170 is provided spaced from separate clamping elements 172, 174. Clamping elements 172, 174 are connected to base member 170 by link arms 176, 178, respectively. Shaft 180 extends along the base member between the clamping elements and base member. Two separate pinch blocks 182, 184 are provided spaced from and above clamping elements 172, 174. Each link arm is connected to the base member and also a clamping element and pinch block by pivot points. Thus, link arm 176 is connected to base member by base pivot point 186, to clamping element 172 by clamping element pivot point 188, and to pinch block 182 by pinch block pivot point 190. Similarly, link arm 178 is connected to base member 170 by base pivot point 192 to clamping element 174 by clamping element pivot point 194, and to pinch block 184 by pinch block pivot point 196. Clamping force applied to the pinch blocks 182, 184 by bolt 200 moves the clamping elements into locking engagement with shaft 180. Thus, as shown in FIG. 16, pinch blocks 182, 184 are located above pivot points 186, 188 and 192, 194.

In FIG. 17, pinch blocks 182, 184 are located below clamping elements 172, 174 and below base pivots 186, 192.

In FIG. 18, pinch blocks 182, 184 are located between the clamping elements 172, 174 and base member 170 and between base pivots 186, 192 and clamping element pivots 188, 194.

Thus, FIGS. 16, 17 and 18 show three different movements to generate locking engagement between the clamping elements and shaft. The pinch bolts which generate the locking engagement can go essentially anywhere along the elongated link arms.

Figure 19:
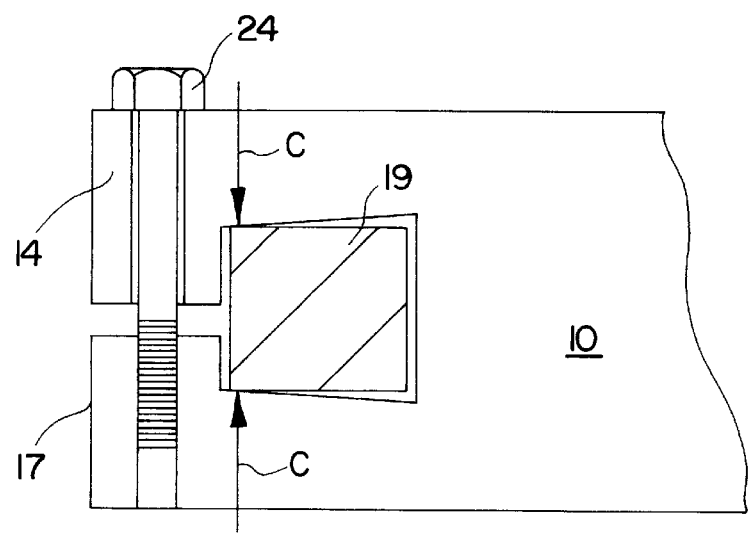
FIG. 19 is a side view of a prior art clamping device with a square shaft.
Figure 20:
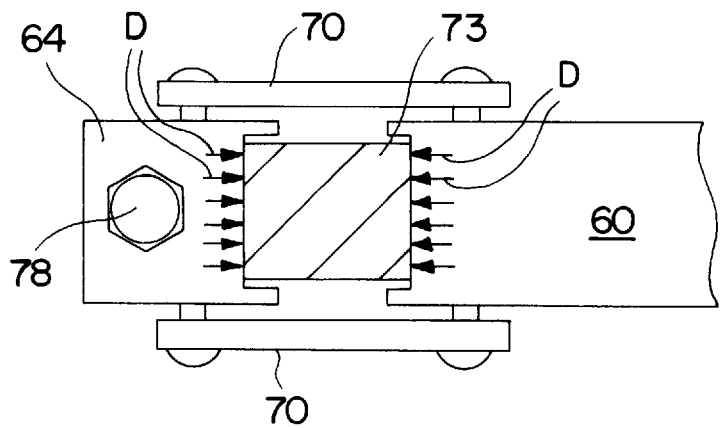
FIG. 20 is a side view of a clamping device of the present invention with a square shaft.

FIGS. 19 and 20 show the advantageous effects of the device of the present invention. FIG. 19 shows a prior art device similar to that shown in FIG. 1 with a square shaft 19. When bolt 24 is tightened placing clamping elements 12 and 14 into locking engagement with shaft 19, high local pressure is applied as shown by arrows C on that portion of shaft 19 closest to the clamping elements. On the other hand, FIG. 20 shows an arrangement of the present invention similar to that shown in FIGS. 6 and 7 with a square shaft 73. In the locked position shown in FIG. 20, a more even pressure distribution shown by arrows D is applied to shaft 73. The unsymmetrical clamping action shown in FIG. 19 distorts the geometry and may cause other problems, such as shaft damage; whereas, no distortion occurs in FIG. 20 of the present invention.

Figure 21:
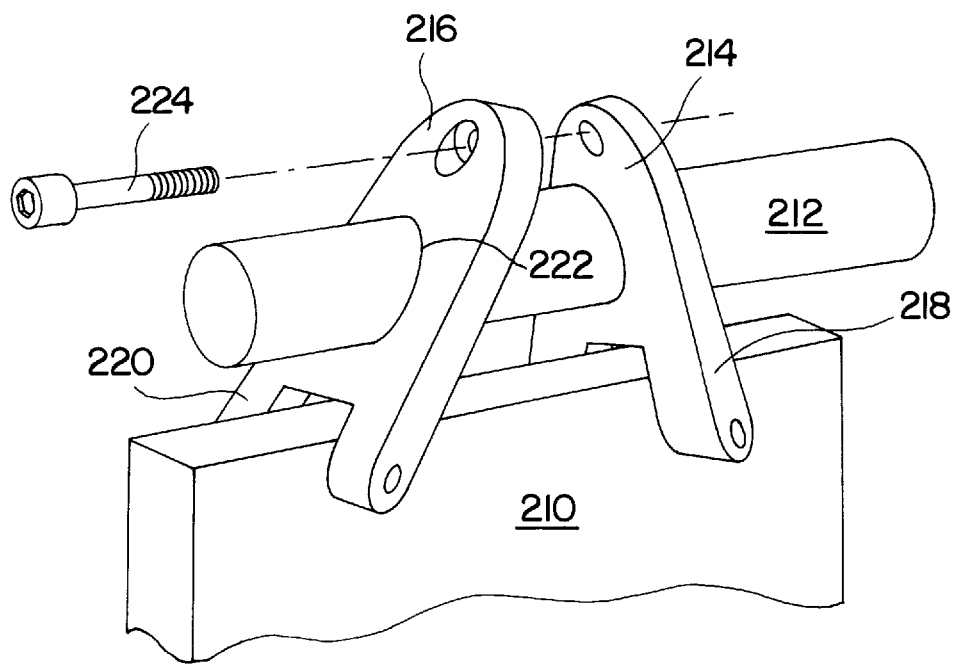
FIGS. 21–23 are perspective and side views of further embodiments of the present invention.

FIG. 21 shows base member 210, shaft 212 and clamping elements 214, 216 which surround the shaft and are connected to the base member by link arms 218, 220. Shaft 212 passes through elliptical shaft bore 222 formed in clamping elements 214, 216. When bolt 224 is tightened, the clamping elements move into locking engagement with the shaft and when bolt 224 is loosened the locking tension is released. Note that in this embodiment, there are no pivots or flexures between the clamp blocks and links. The clamp block, the pinch block and link are all one rigid or semi-rigid piece. Also, there are no surfaces of the shaft that contact the base.

Figure 22:
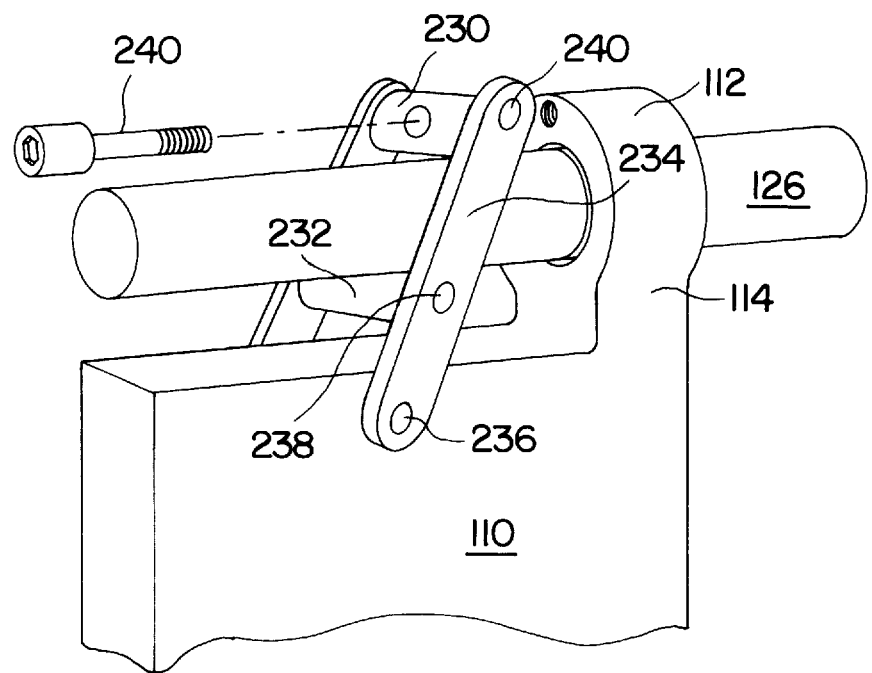

FIG. 22 is similar to FIG. 10 where second clamping elements include an upper second clamping element 230 and a lower second clamping element 232 on opposed sides of the shaft and connected to base member 110 by link arms 234 having a pivot point 236 affixed to the base member, a pivot point 238 affixed to the lower second clamping element 232, and a pivot point 240 affixed to the upper second clamping element 230. Tightening bolt 242 pivots link arms 234 and moves the clamping elements 230, 232 into locking engagement with shaft 126.

Figure 23:
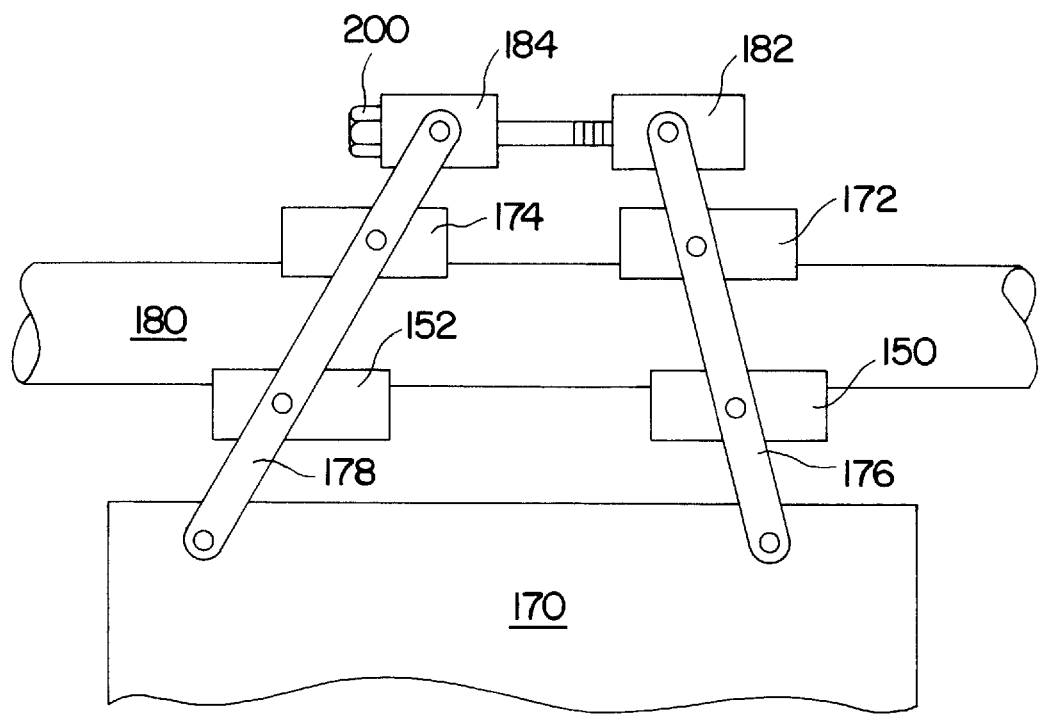

FIG. 23 is similar to FIG. 16 using upper first clamping elements 172, 174 and lower second clamping elements 250, 252, with the upper and lower clamping elements situated on opposed sides of shaft 180. Tightening bolt 200 moves the upper and lower clamping elements into locking engagement with shaft 180.

The clamping device of the present invention is versatile and easy to manufacture. The device is readily adaptable to a variety of applications where assembly of a shaft and base member are desired, as in scaffolding or a wide variety of construction applications, and at the same time at a low cost with strong clamping pressure and minimum distortion.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Clamping device in combination with a shaft and a base member for clamping the shaft to the base member, which comprises:

at least one base member;

at least one movable clamping element spaced from the base member;

a shaft having a one-piece construction adjacent said base member and a longitudinal axis, said shaft extending along the base member and between the base member and clamping element;

linking means extending between the clamping element and base member connecting the clamping element to the base member; and means for moving the clamping element in a direction parallel to the longitudinal axis of the shaft from unlocking engagement with the shaft into locking engagement with the shaft to clamp the shaft between the clamping element and base member and exert a clamping action on the shaft generally parallel to the shaft.

2. Clamping device according to claim 1, including at least two clamping elements spaced from the base member and spaced apart by a channel running generally perpendicular to the axis of the shaft which forms a gap between said clamping elements in the locked position.

3. Clamping device according to claim 2, wherein the channel extends to the base member.

4. Clamping device according to claim 3, including an enlarged opening in the channel as a strain relief means.

5. Clamping device according to claim 2, wherein the channel flares outwardly adjacent the shaft to create an enlarged opening surrounding the shaft in the locked position.

6. Clamping device according to claim 2, wherein the base member and clamping elements are separate pieces, and the clamping elements are connected to the base member by link arms which pivot on pivot points on the base member and on the clamping elements.

7. Clamping device according to claim 6, wherein the link arm upper portions are connected to the clamping elements and move in an arc upon moving the clamping elements into locking engagement with the shaft.

8. Clamping device according to claim 6, wherein the means for moving the clamping elements is a bolt, and tightening the bolt moves the clamping elements into locking engagement with the shaft.

9. Clamping device according to claim 8, wherein tightening the bolt moves the clamping elements closer together.

10. Clamping device according to claim 8, wherein tightening the bolt moves the clamping elements farther apart.

11. Clamping device according to claim 6, including open-sided clamping elements connected to the base member by linking means which pivot on pivot points.

12. Clamping device according to claim 11, wherein said shaft is non-circular.

13. Clamping device according to claim 6, including separate pinch blocks connected to the base member and clamping elements by said link arms, wherein said means for moving the clamping elements includes means for moving the pinch blocks.

14. Clamping device according to claim 13, wherein the pinch blocks are located above the clamping elements.

15. Clamping device according to claim 13, wherein the pinch blocks are located below the clamping elements.

16. Clamping device according to claim 13, wherein the pinch blocks are located between the clamping elements and base member.

17. Clamping device according to claim 13, including clamping elements on opposed sides of the shaft.

18. Clamping device according to claim 2, wherein the channel has a stepped configuration.

19. Clamping device according to claim 2, including a first clamping element integrally affixed to the base member, and a second clamping element as a separate piece connected to the base member by a link arm which pivots on pivot points.

20. Clamping device according to claim 2, wherein the clamping elements surround the shaft.

21. Clamping device according to claim 20, wherein the shaft is seated in an elliptical bore when in locking engagement with the clamping elements.

22. Clamping device according to claim 2, including two clamping elements on opposed sides of the shaft.

23. Clamping device according to claim 1, wherein the shaft is seated in a shaft bore, and the means for moving is a bolt seated in a bolt hole, wherein the shaft bore and bolt hole are generally parallel to each other.

24. Clamping device according to claim 23, wherein the shaft is a circular shaft.

25. Clamping device according to claim 23, wherein the shaft is a non-circular shaft.

26. Clamping device according to claim 1, including a channel adjacent said at least one clamping element, wherein the channel runs diagonally with respect to the shaft in the locked position.

27. Clamping device according to claim 1, wherein the shaft is seated in a shaft bore, and wherein the shaft bore is formed by the base member and said at least one clamping element.

28. Clamping device according to claim 27, wherein said clamping element has a geometry which conforms to the shaft.

29. Clamping device according to claim 27, wherein the base member has a geometry conforming to the shaft.

30. Clamping device according to claim 1, wherein a single clamping element is provided separate from and spaced from the base member and connected thereto by at least one link arm which pivots on pivot points.

31. Clamping device according to claim 30, wherein the means for moving the clamping element is a mechanical actuator.

32. Clamping device according to claim 1, wherein said base member extends essentially perpendicular to said shaft.

33. Clamping device according to claim 1, wherein said base member is adjacent the shaft in the unlocked and locked condition.

34. Clamping device according to claim 1, wherein said linking means include thin portions to provide link flexure in the direction of clamping.

35. Clamping device according to claim 1, wherein a portion of the base member extends adjacent said shaft in the locked and unlocked condition, and wherein said shaft has a one-piece construction along that portion of the base member which extends adjacent said shaft in the locked and unlocked condition.

* * * * *